(12) United States Patent
Chaterlea et al.

(10) Patent No.: US 8,348,484 B2
(45) Date of Patent: Jan. 8, 2013

(54) VEHICLE EXTERIOR LAMP

(75) Inventors: William Chaterlea, Laguna Nigel, CA (US); Jeffrey Nield, Corona Del Mar, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 343 days.

(21) Appl. No.: 12/765,194

(22) Filed: Apr. 22, 2010

(65) Prior Publication Data

US 2011/0260616 A1   Oct. 27, 2011

(51) Int. Cl.
*B60Q 1/26* (2006.01)

(52) U.S. Cl. .................. 362/487; 362/522; 362/545

(58) Field of Classification Search .................. 362/496, 362/505, 487, 521, 522, 540, 541, 542, 545
See application file for complete search history.

(56) References Cited

U.S. PATENT DOCUMENTS

| | | | | |
|---|---|---|---|---|
| 5,924,785 | A * | 7/1999 | Zhang et al. | 362/545 |
| 6,520,666 | B1 * | 2/2003 | Beyerlein et al. | 362/545 |
| 7,497,606 | B1 * | 3/2009 | Tsai et al. | 362/545 |
| 7,635,213 | B2 * | 12/2009 | Lee | 362/545 |

* cited by examiner

*Primary Examiner* — David V Bruce
(74) *Attorney, Agent, or Firm* — Brooks Kushman P.C.; Frank A. MacKenzie

(57) ABSTRACT

A vehicle exterior lamp includes an optical structure defining a plurality of geometric indicia, and a plurality of light emitting diodes (LEDs) for emitting light. Light emitted by the LEDs is directed towards the optical structure, to interact with the optical structure, and exit the exterior lamp.

19 Claims, 5 Drawing Sheets

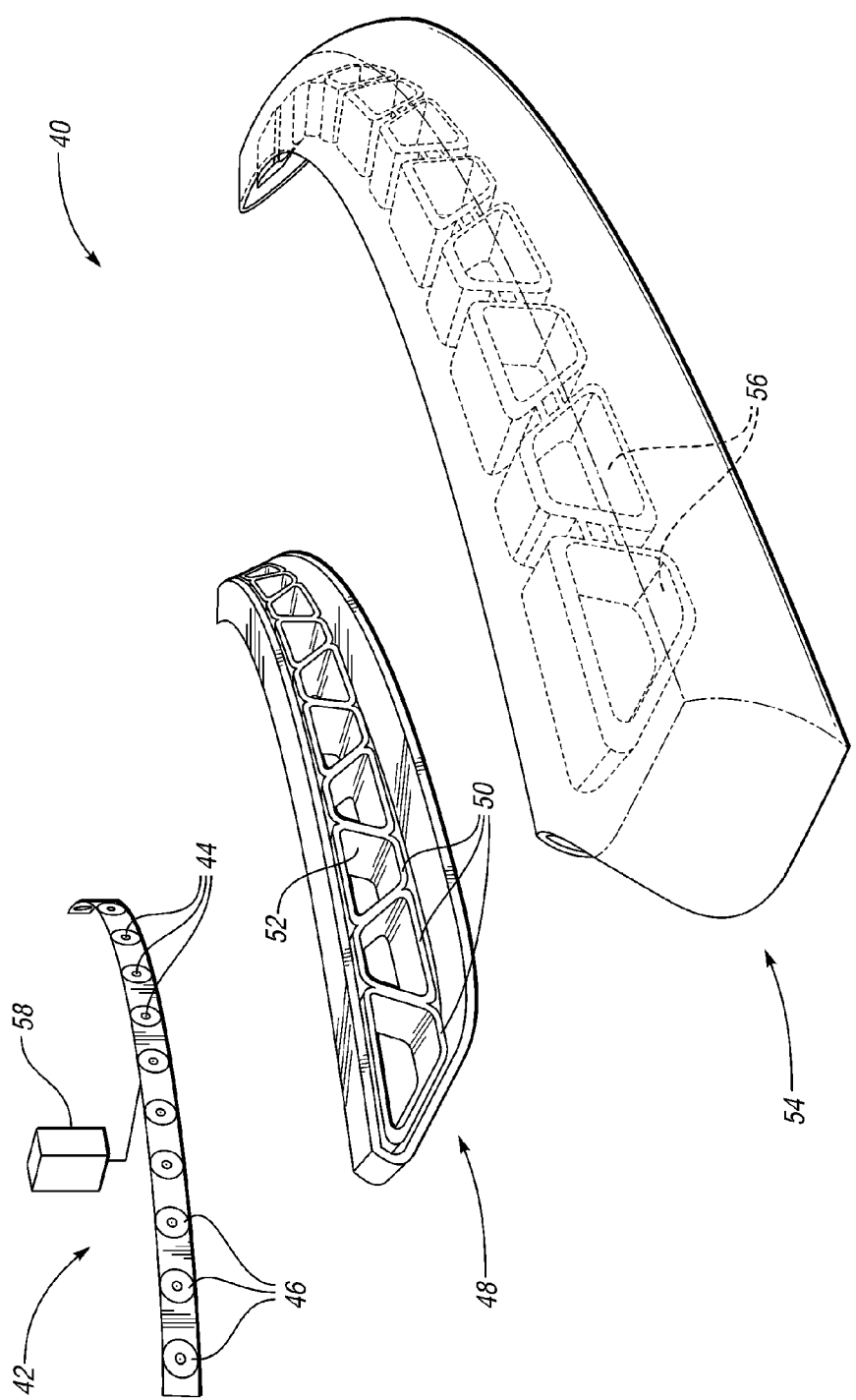

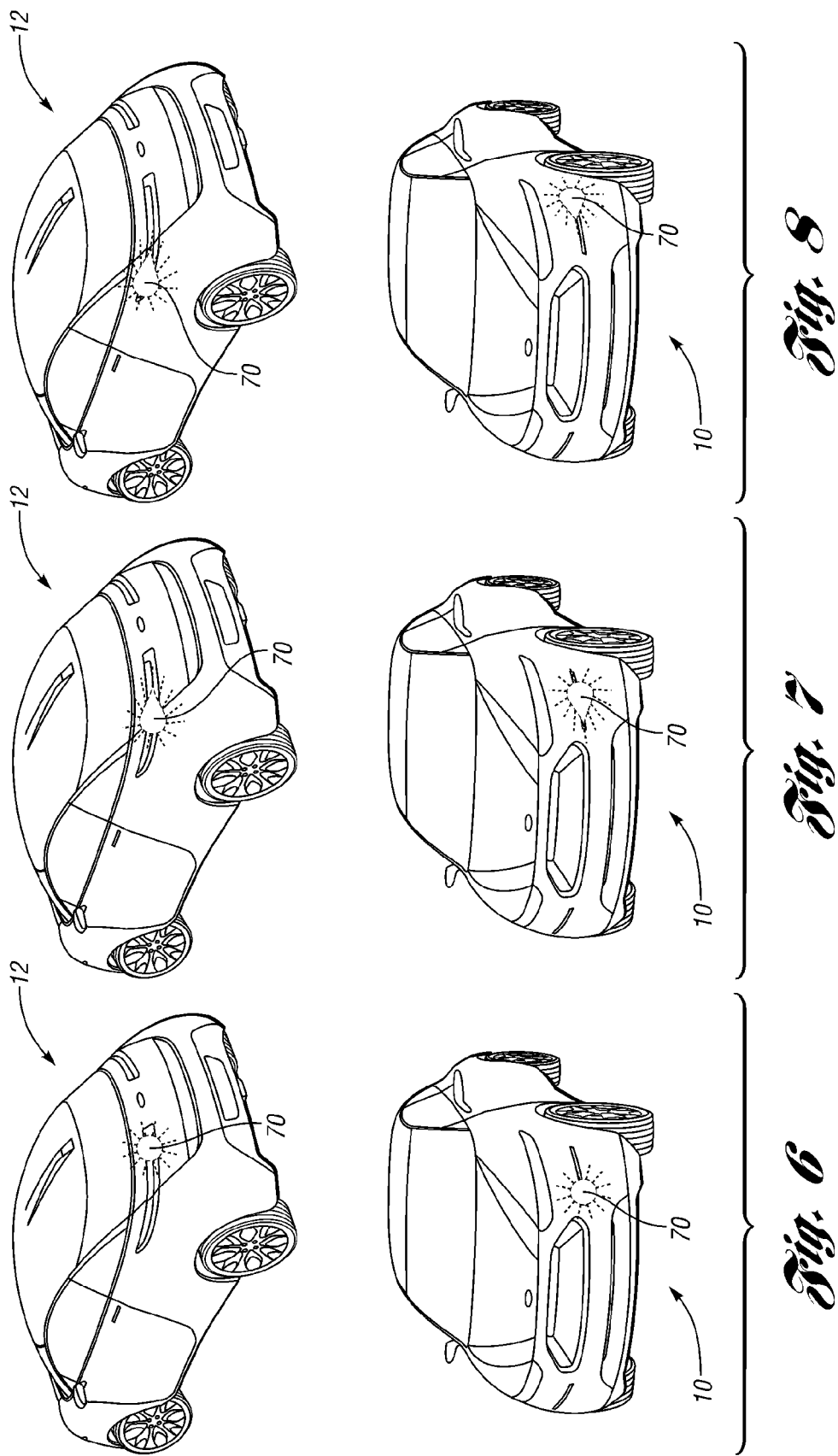

VEHICLE EXTERIOR LAMP

TECHNICAL FIELD

Various embodiments relate to exterior lamp systems for use in vehicles.

BACKGROUND ART

It is known in the art to provide passenger vehicles with a lighting system having various exterior lamps. The exterior lamps are lighting and signaling devices located on the front, sides, and rear of the vehicle. One purpose of the exterior lamps is to provide illumination for the driver to operate the vehicle safely. Another purpose of the lamps is to provide information regarding the vehicle presence and vehicle operating state to others.

Vehicles are often equipped with projector headlamp systems located on a front portion of the vehicle. Most projector headlamp systems in production combine a halogen or High Intensity Discharge (HID) source with a reflector, a lens, and a transparent cover that protects working parts and enhances appearance. Headlamps usually have a high beam function and a low beam function, as well as a daytime running operation. The vehicles also have taillamps to provide lighting behind the vehicle and improve the visibility of the vehicle from behind.

Other exterior lamps are also commonly provided on a vehicle. Brakelamps are placed on the rear portion of the vehicle, which illuminate during a braking operation to inform others that the vehicle is slowing or stopping. Often the taillamps and the brakelamps are combined into a rear combination lamp. Foglamps and parklamps are also often placed on a vehicle to provide lighting during poor visibility operations and while the vehicle is parked, respectively.

Turn signal lamps are provided on the front portion and rear portion of the vehicle and are used to signal a turning operation by the vehicle. The turn signal lamps may be incorporated into other existing exterior lamps, or be separate lamps on the vehicle.

Light emitting diodes (LEDs) are becoming more common as a light source in headlamps, rear combination lamps, and other exterior lamps in vehicles. LED headlamps consume less energy that halogen bulbs or HID lamps, and have a longer lifetime before replacement.

SUMMARY

In one embodiment, a vehicle exterior lamp is provided with an optical structure defining a plurality of geometric indicia, and a plurality of light emitting diodes (LEDs) for emitting light. The light emitted by the LEDs is directed towards the optical structure, to interact with the optical structure, and exit the exterior lamp.

A further embodiment discloses that the geometric indicia are generally trapezoidal.

An even further embodiment discloses that the geometric indicia are defined by apertures in the optical structure.

A further embodiment discloses that the geometric apertures are positioned in a generally parallel direction to the output of the exterior lamp when the exterior lamp is installed in a vehicle.

An even further embodiment discloses that the optical structure is formed from acrylic.

A further embodiment provides a lens positioned to interact with light emitted from the LEDs.

An even further embodiment discloses that the lens includes internal laser etching.

A further embodiment provides a beam collimator to generally collimate at least a portion of light emitted from an illuminated LED into a directed beam to the optical structure.

An even further embodiment provides a controller. A first portion of the LEDs are illuminated to provide a first light level from the headlamp, with the light from the first portion of LEDs being diffused through the optical structure.

A further embodiment discloses that the first portion of LEDs are laterally offset from the apertures of the optical structure.

An even further embodiment provides a controller. A second portion of the LEDs are illuminated to provide a second light level from the headlamp, with the light from the second portion of LEDs directed through the apertures of the optical structure.

A further embodiment discloses that the second portion of the LEDs are laterally aligned with the apertures of the optical structure.

An even further embodiment discloses that each aperture is defined by a corresponding edge, with the edges interacting with light from the LEDs to provide a visual effect.

A further embodiment discloses that the edges are frosted.

An even further embodiment discloses that the exterior lamp is further defined as one of a forward headlamp, a tail lamp, a turn signal lamp, a parklamp, a foglamp, and an emergency lamp.

A further embodiment discloses that the exterior lamp is further defined as a turn signal lamp, and a portion of the LEDs are illuminated sequentially at a first rate, and unilluminated sequentially at a second rate, with the first rate being faster than the second rate.

In another embodiment, a lighting system for a vehicle exterior lamp is provided with an optical structure defining trapezoidal indicia, a plurality of light emitting diodes (LEDs), a lens, and a control module for illuminating the plurality of LEDs. The optical structure is positioned between the plurality of LEDs and the lens, the indicia arranged such that a first portion of the light from the LEDs passes through the indicia in a generally parallel direction with the light output of the exterior lamp when the exterior lamp is installed in a vehicle.

A further embodiment discloses that the optical structure transmits a second portion of the light from the LEDs.

An even further embodiment discloses that the optical structure diffuses a second portion of the light from the LEDs.

In yet another embodiment, a turn signal lamp system for a vehicle is provided with an optical structure defining trapezoidal indicia, a plurality of light emitting diodes (LEDs), a lens, and a control module for illuminating the plurality of LEDs. The optical structure is positioned between the plurality of LEDs and the lens, and the apertures are arranged such that a first portion of the light from the LEDs passes through apertures in a generally parallel direction with the light output of the exterior lamp when the exterior lamp is installed in a vehicle. At least two adjacent LEDs are illuminated sequentially at a first rate, and unilluminated sequentially at a second rate, with the first rate being faster than the second rate.

BRIEF DESCRIPTION OF THE DRAWINGS

FIG. 5 is an exploded schematic view of an exterior lamp according to an embodiment;

FIG. 6 is a schematic of a signal lamp light pattern according to an embodiment;

FIG. 7 is a schematic of another signal lamp light pattern; and

FIG. 8 is a schematic of yet another signal lamp light pattern.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
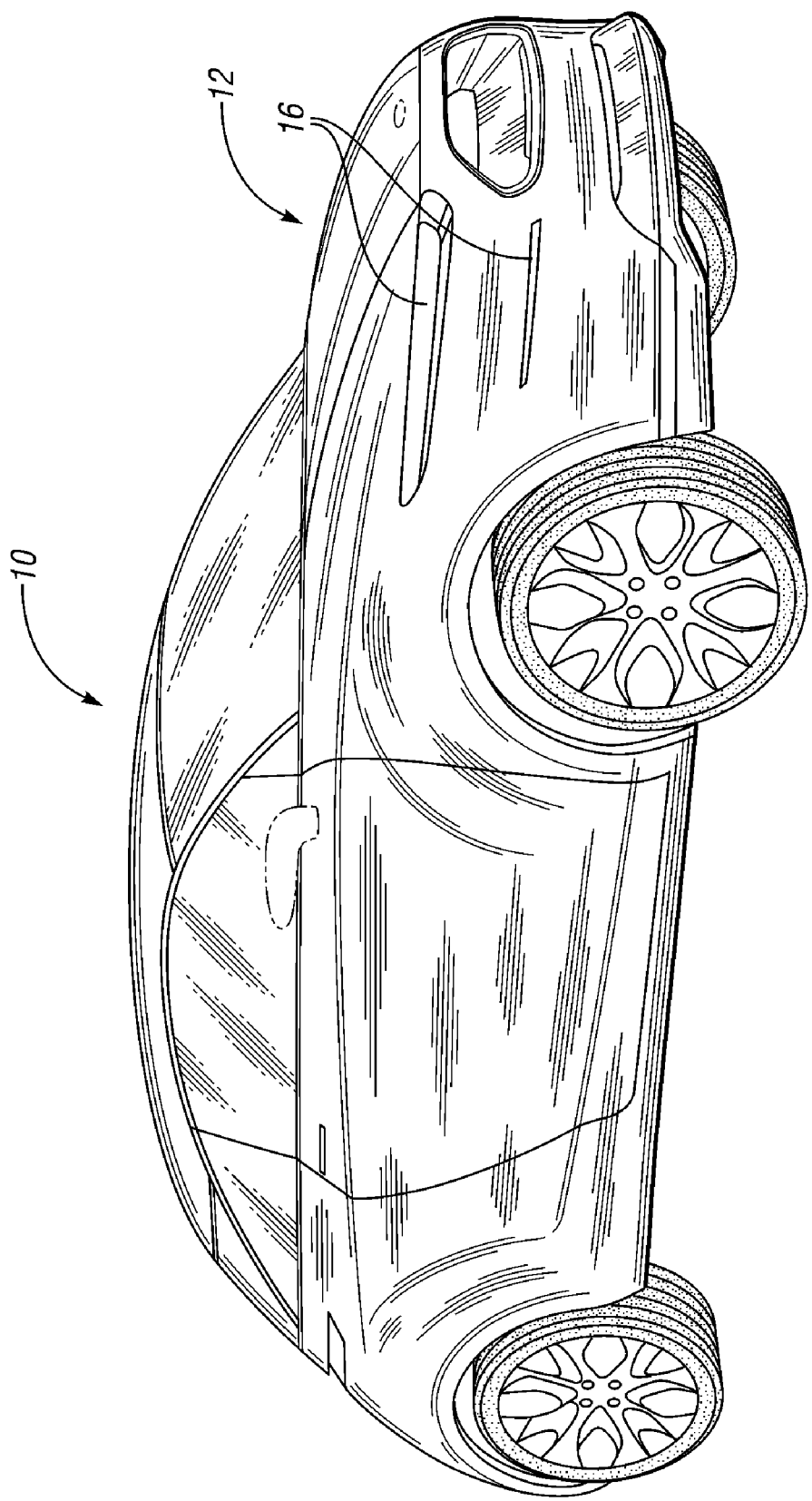
FIG. 1 is a front perspective view of a vehicle with an exterior lamp system according to an embodiment.
Figure 2:
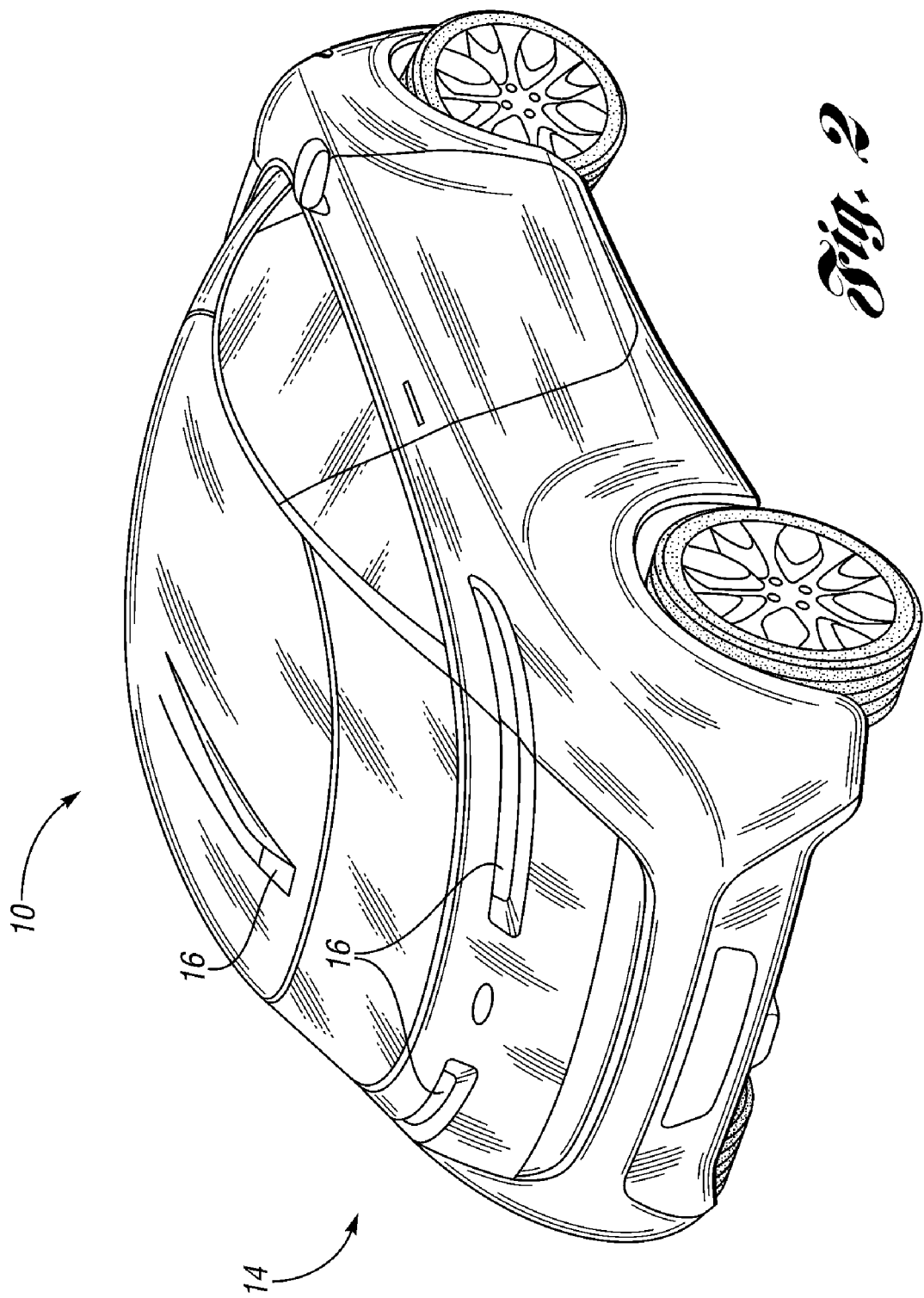
FIG. 2 is a rear perspective view of the vehicle of FIG. 1 with an exterior lamp system.

FIGS. 1-2 illustrate a vehicle 10, which has a front portion 12 and a rear portion 14. An exterior lamp system 16 is located on the front and rear portions 12, 14. The exterior lamp system 16 as shown includes front headlamps, turn signals, turn lamps, rear combination lamps, and a third brake lamp. The third brake lamp may be located in a "mohawk" structure located on the roof of the vehicle 10. Of course any number of exterior lamps are contemplated for the system 16, and the system 16 may only be on a front portion 12 or a rear portion 14 of the vehicle 10.

Figure 3:
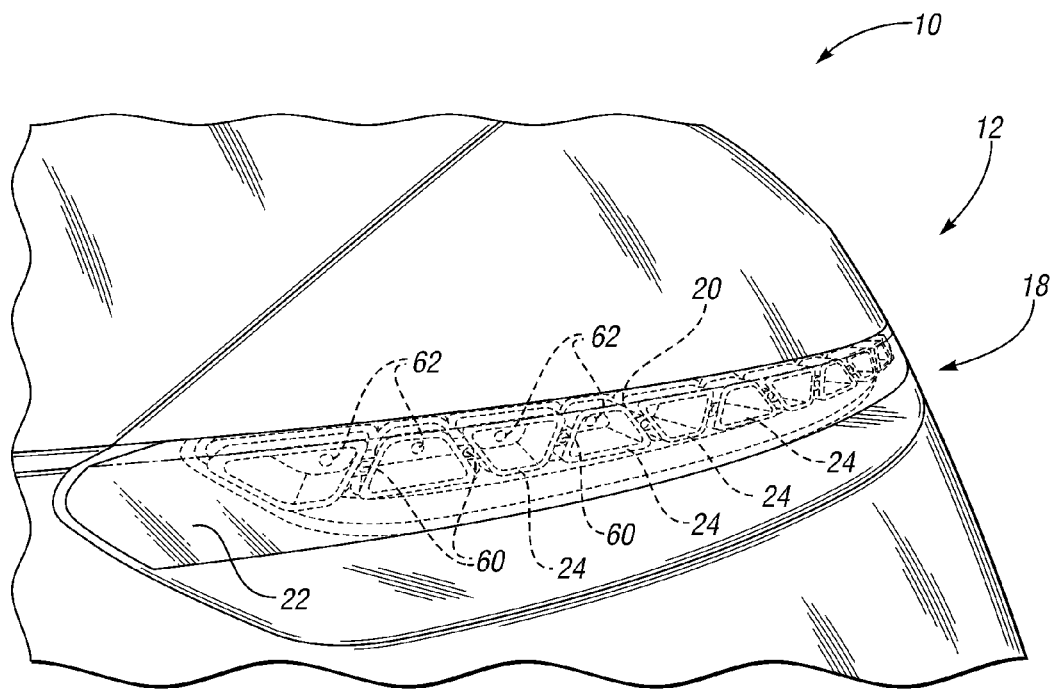
FIG. 3 is a partial perspective view of a front exterior lamp according to another embodiment.

FIG. 3 depicts a partial view of a front portion 12 of the vehicle 10. A front headlamp 18 is shown, which may be part of a larger exterior lamp system 16. The headlamp 18 contains an optical structure 20 located behind a lens 22. The optical structure 20 has a series of indicia 24. Light being emitted by the headlamp 18 interacts with the optical structure 20 and the indicia 24 before travelling through the lens 22 and exiting the headlamp 18. The indicia 24 may have different optical properties than the remaining portion of the optical structure 20, to shape or transform the light, or to provide a visual effect within the headlamp 18.

Figure 4:
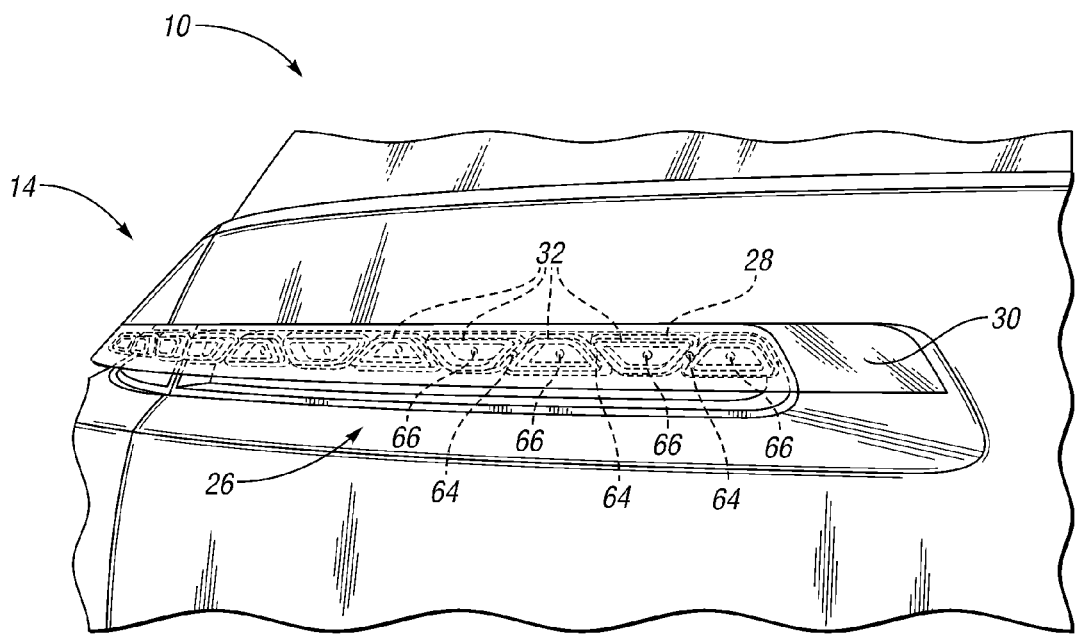
FIG. 4 is an enlarged partial perspective view of a rear exterior lamp according to a further embodiment.

FIG. 4 is a partial view of a rear portion 14 of the vehicle 10. A rear combination lamp 26 is shown, although the exterior lamp 16 may also be a brakelamp, taillamp, or other rear exterior lamp. The rear combination lamp 26 also has an optical structure 28 located behind a lens 30. The optical structure 28 has a series of indicia 32. Light being emitted by the rear combination lamp 26 interacts with the optical structure 28, the indicia 32, and the lens 30 as it exits the rear lamp 26.

FIG. 5 is an exploded view of an embodiment of an exterior lamp 40. The exterior lamp 40 may be used as a forward headlamp, rear combination lamp, foglamp, turn signal lamp, or other exterior lamp as is known in the art. Light for the external lamp 40 is provided by an array 42 of light emitting diodes (LEDs) 44. Any number of LEDs 44 are contemplated for the array 42, and more than one array may be used in the lamp 40. The LEDs 44 may be arranged within the array 42 in any number of columns or rows. The LEDs 44 may have a beam collimator 46 associated with some or all of the LEDs 44 to direct the light from an associated LED 44 into a generally parallel direction. The LEDs 44 may be white, red, amber, or other colors as desired for the light from the lamp 40.

An optical structure 48 is placed in front of the LED array 42 and interacts with light emitted from the LEDs 44 in the LED array 42. The optical structure 48 has a series of indicia 50. In one embodiment, the indicia 50 are apertures extending through the optical structure 48. The indicia are generally trapezoidal, although any geometric shape, or other shape, may be used. In one embodiment, the indicia 50 are generally trapezoidal apertures, and abut one another along the length of the optical structure 48. The trapezoidal apertures of the indicia 50 are generally parallel to the direction of the light output of the exterior lamp 40, when the exterior lamp 40 is installed for use in a vehicle 10.

In one embodiment, the indicia 50 have edges 52 associated with all of the indicia 50. The edges 52 may further interact with the light from the array 42. The edges 52 may be frosted or have a coating to reduce the transmission of light through them, or alternatively may be reflective. The edges 52 interact with light from the LEDs 44 to provide a visual effect to the exterior lamp 40. The edges 52 may appear to glow from outside the vehicle 10, thereby outlining the indicia 50. The edges 52 may also act to better direct or channel light.

In other embodiments, the indicia 50 may be molded depressions, protuberances, etched lines, or other surface shapes or optical changes to the structure 48 which interact with the light from the LED array 42.

A lens 54 is arranged outside the optical structure 48 to generally enclose the exterior lamp 40. The lens 54 may be designed such that it is generally flush with adjacent structures of the vehicle 10. The lens 54 additionally directs and interacts with the light from the LEDs 44 to create and shape a beam. The lens 54 may include prismatic or other optical formations, and may also include microreplicated lenses. In one embodiment, the lens 54 has a laser ablated pattern 56. The laser ablated pattern 56 may generally correspond to the indicia on the optical structure. The laser ablated pattern 56 may be in the lens 54 interior, and is also known as subsurface laser engraving. The pattern 56 may have a frosted effect to additionally interact with light from the LED array 42.

Both the optical structure 48 and the lens 54 may be made from acrylic, plastic, or other materials as is known in the art.

FIG. 5 also depicts a controller 58 or a control module. The controller 58 is connected to the LEDs 44 in the array 42 to illuminate various LEDs 44 in the array 42. The LEDs 44 may be arranged in the LED array 42 such that they interact primarily with different portions of the optical structure 48 and/or the lens 54.

For example, referring to FIGS. 3 and 5 with a front headlamp 18, the controller 58 may illuminate a first portion of the LEDs 60 to provide a running lamp function, and a second portion of the LEDs 62 to provide a low beam or a high beam function. The controller 58 may also illuminate a different number of the LEDs 62 to differentiate between a high and a low beam and provide the light intensity and beam shape needed for the high and low beam pattern, or to change the cutoff pattern, or to provide dynamic lighting, for example when the vehicle 10 is turning or changing speeds.

In the running lamp function, the LEDs 60 emit light which interacts with the optical structure and may be partially diffused. The diffused light may also interact with the indicia 24 to provide a glowing effect. The LEDs 60 are laterally offset from the indicia 24. In the low or high beam function, the LEDs 62 emit light which interacts with the indicia 24 and is at least partially transmitted through the indicia 24 to provide the light for a beam. The LEDs 62 may be generally laterally aligned with the indicia 24. In one embodiment, the indicia 24 are apertures through the optical structure 20 and the light from the LEDs 36 is directed through the indicia 24 apertures. An edge 52 of the indicia 50, as shown in FIG. 5, may additionally direct the light from the LEDs 62 into a beam.

In another embodiment having a rear combination lamp, as shown in FIGS. 4 and 5, the controller 58 may illuminate a first portion of the LEDs 64 to provide a running taillamp function, and a second portion of the LEDs 66 to provide a brakelamp function. In the taillamp function, the LEDs 64 emit light which interacts with the optical structure and may be partially diffused. The LEDs 64 are laterally offset from the indicia 32. The diffused light may also interact with the indicia 32 to provide a glowing effect. In the brakelamp function, the LEDs 66 emit light which interacts with the indicia 32 and is at least partially transmitted through the indicia 32 to provide a higher intensity light level to signify braking. The LEDs 66 are generally laterally aligned with the indicia 32 of the optical structure 28. In one embodiment, the indicia 32 are apertures through the optical structure 28 and the light from the LEDs 66 is directed through the indicia 32 apertures.

Referring now to FIGS. 5 and 6-8, an exterior lamp 40 may be used as a turn signal lamp 70. Alternatively, the turn signal lamp 70 may be integrated into a front headlamp 18 or a rear combination lamp 26. The turn signal lamp 70, as shown in FIGS. 6-8, has the same components as the exterior lamp 40 of FIG. 5. A controller 58 is connected to LEDs 44 in an array 42 to provide light for the turn signal lamp 70. An optical structure 48 with indicia 50 may be present, or a more simplified diffuser as the optical structure 48 may be used. The controller 58 selectively illuminates and unilluminates the LEDs 44 in a predetermined fashion to provide the turn signal beam pattern. The LEDs 44 on the inner portion of the lamp 70 are illuminated first, as shown in FIG. 6. The controller 58 then illuminates adjacent outer LEDs 44, as shown in FIG. 7. The controller 58 continues to illuminate the adjacent outside LEDs 44 to the beam, as shown in FIG. 8, while smoothly unilluminating the innermost LEDs 44 on the lamp 70. This combined sequential illumination and sequential unillumination, at different rates, leads to the turn signal lamp 70 pattern resembling a comet in appearance. The controller 70 may illuminate LEDs 44 at the front edge of the comet structure at a different rate than the LEDs 44 at the tail edge of the comet structure are unilluminated. The front edge LEDs 44 are illuminated faster than the tail edge LEDs 44 are unilluminated, thereby creating the beam pattern shown in FIG. 8.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Additionally, features of various implementing embodiments may be combined to form further embodiments of the invention.

What is claimed:

1. A vehicle exterior lamp comprising:
   an optical structure defining a plurality of geometric indicia; and
   a plurality of light emitting diodes (LEDs) for emitting light, wherein light emitted by the LEDs is directed towards the optical structure, to interact with the optical structure, and exit the exterior lamp;
   wherein each indicia is defined by a corresponding edge, the edges interacting with light from the LEDs to provide a visual effect.

2. The vehicle exterior lamp of claim 1 wherein the geometric indicia are generally trapezoidal.

3. The vehicle exterior lamp of claim 1 wherein the geometric indicia are defined by apertures in the optical structure.

4. The exterior lamp of claim 1 wherein the geometric apertures are positioned in a generally parallel direction to the output of the exterior lamp when the exterior lamp is installed in a vehicle.

5. The vehicle exterior lamp of claim 1 wherein the optical structure is formed from acrylic.

6. The vehicle exterior lamp of claim 1 further comprising a lens positioned to interact with light emitted from the LEDs.

7. The vehicle exterior lamp of claim 6 wherein the lens includes internal laser ablation.

8. The vehicle exterior lamp of claim 1 further comprising a beam collimator to generally collimate at least a portion of light emitted from an illuminated LED into a directed beam to the optical structure.

9. The vehicle exterior lamp of claim 1 further comprising a controller, wherein a first portion of the LEDs are illuminated to provide a first light level from the headlamp, the light from the first portion of LEDs being diffused through the optical structure.

10. The vehicle exterior lamp of claim 9 wherein the first portion of LEDs are laterally offset from the indicia of the optical structure.

11. The vehicle exterior lamp of claim 1 further comprising a controller, wherein a second portion of the LEDs are illuminated to provide a second light level from the headlamp, the light from the second portion of LEDs directed through the indicia of the optical structure.

12. The vehicle exterior lamp of claim 11 wherein the second portion of the LEDs are laterally aligned with the indicia of the optical structure.

13. The vehicle exterior lamp of claim 1 wherein the edges are frosted.

14. The vehicle exterior lamp of claim 1 wherein the exterior lamp is further defined as one of a forward headlamp, a rear combination lamp, a turn signal lamp, a parklamp, a foglamp, and an emergency lamp.

15. The vehicle exterior lamp of claim 1 wherein the exterior lamp is further defined as a turn signal lamp; and
    wherein a portion of the LEDs are illuminated sequentially at a first rate, and unilluminated sequentially at a second rate, wherein the first rate is faster than the second rate.

16. A lighting system for a vehicle exterior lamp, the lighting system comprising:
    an optical structure defining trapezoidal indicia;
    a plurality of light emitting diodes (LEDs);
    a lens; and
    a control module for illuminating the plurality of LEDs; and
    wherein the optical structure is positioned between the plurality of LEDs and the lens, the indicia arranged such that a first portion of the light from the LEDs passes through the indicia in a generally parallel direction with the light output of the exterior lamp when the exterior lamp is installed in a vehicle.

17. The lighting system of claim 16 wherein the optical structure transmits a second portion of the light from the LEDs.

18. The lighting system of claim 16 wherein the optical structure diffuses a second portion of the light from the LEDs.

19. A turn signal lamp system for a vehicle, the lamp system comprising:
- an optical structure defining trapezoidal indicia;
- a plurality of light emitting diodes (LEDs);
- a lens; and
- a control module for illuminating the plurality of LEDs; and
- wherein the optical structure is positioned between the plurality of LEDs and the lens, the indicia arranged such that a first portion of the light from the LEDs passes through the indicia in a generally parallel direction with the light output of the turn signal lamp when the turn signal lamp is installed in a vehicle; and
- wherein at least two adjacent LEDs are illuminated sequentially at a first rate, and unilluminated sequentially at a second rate, wherein the first rate is faster than the second rate.

* * * * *